US007124012B2

(12) United States Patent
Feder et al.

(10) Patent No.: US 7,124,012 B2
(45) Date of Patent: Oct. 17, 2006

(54) METHOD AND DEVICE FOR DETERMINING A DRIVER TORQUE SETPOINT FOR AN INTERNAL COMBUSTION ENGINE

(75) Inventors: Johannes Feder, Regensburg (DE); Stefan Maier, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/125,553

(22) Filed: May 9, 2005

(65) Prior Publication Data

US 2005/0251319 A1 Nov. 10, 2005

(30) Foreign Application Priority Data

May 7, 2004 (DE) ...................... 10 2004 022 554

(51) Int. Cl.
*G06F 19/00* (2006.01)
*B60T 7/12* (2006.01)

(52) U.S. Cl. ...................... 701/101; 701/104; 123/350; 123/361; 123/480

(58) Field of Classification Search ................ 701/101, 701/102, 103, 104, 105; 123/295, 305, 350, 123/361, 478, 480
See application file for complete search history.

(56) References Cited

U.S. PATENT DOCUMENTS 6,205,976 B1 * 3/2001 Schmidt et al. ............. 123/350
6,357,419 B1 * 3/2002 Langer et al. .............. 123/443
6,386,174 B1 * 5/2002 Volz et al. .................. 123/295
6,394,063 B1 * 5/2002 Volz et al. .................. 123/295
6,474,293 B1 * 11/2002 Bauer et al. ................ 123/295
6,578,546 B1 * 6/2003 Schultalbers et al. ....... 123/300
6,789,527 B1 * 9/2004 Sauler et al. .......... 123/406.21
6,813,879 B1 * 11/2004 Wagner et al. ................ 60/284

FOREIGN PATENT DOCUMENTS

DE 196 41 532 A1 9/1998
DE 197 14 503 A1 10/1998
DE 199 05 604 A1 8/2000

* cited by examiner

*Primary Examiner*—John T. Kwon
(74) *Attorney, Agent, or Firm*—Laurence A. Greenberg; Werner H. Stemer; Ralph E. Locher

(57) ABSTRACT

A method for determining the driver torque setpoint uses inputs from a drive pedal sensor, which senses the pedal position of a drive pedal. Depending on at least one switching parameter, different modes of calculation are activated, thus enabling the pedal position to be assigned to the driver torque setpoint. After the switchover from an old mode of calculation to a new mode of calculation, the driver torque setpoint is progressively adjusted, starting from the driver torque setpoint under an old interpretation of the pedal position, corresponding to the old set of characteristics, towards the driver torque setpoint under a new interpretation of the pedal position, corresponding to the new set of characteristics, and specifically in dependence on the time graph of the pedal position and simultaneously as a function of time, disregarding the time graph of the pedal position.

6 Claims, 4 Drawing Sheets

METHOD AND DEVICE FOR DETERMINING A DRIVER TORQUE SETPOINT FOR AN INTERNAL COMBUSTION ENGINE

BACKGROUND OF THE INVENTION

Field of the Invention

The invention relates to a method and a device for determining the driver torque setpoint, for an internal combustion engine to which is assigned a drive pedal and a drive pedal sensor, which senses the pedal position of the drive pedal. For the purpose of controlling internal combustion engines, the driver torque setpoint is determined at regular intervals as a function of the pedal position. The torque setting for the internal combustion engine is determined as a function of the driver torque setpoint, together with the additional torque requirements from other units such as for example an air-conditioning system, an idle speed regulator or a vehicle speed limiter, and a traction slip control system.

In order for the driver of a vehicle, in which the internal combustion engine is disposed, to perceive the driving characteristics as pleasant, it is critical that movements of the drive pedal made by the driver are converted into a driver torque setpoint that corresponds to what the driver is expecting. Vehicles often have switches, by which it is possible to switch between sporty and fuel-economy driving characteristics. Over and above this there are often, especially with automatic transmissions, various drive modes, from each of which the driver expects a different reaction to a change in the pedal position. In addition, particularly in cross-country or off-road vehicles, countershaft gearboxes may be provided, to which are to be assigned responses that differ depending on the gear selection for the countershaft gearbox.

The driver often prompts a switchover between the sets of characteristics without the drive pedal being moved at the same time. The driver then expects that there will then also be no detectable change in the torque. Hence, on grounds of comfort, it is necessary to ensure that switching over between one set of characteristics and another does not cause a step change in the torque, which would be felt as an unpleasant jerking. On the other hand, the new drive characteristics which are desired should be applied as quickly as possible, without the transition from the old set of characteristics to the new set of characteristics being detectable by the driver.

SUMMARY OF THE INVENTION

It is accordingly an object of the invention to provide a method and a device for determining a driver torque setpoint for an internal combustion engine which overcomes the above-mentioned disadvantages of the prior art methods and devices of this general type, which determine the driver torque setpoint in such a way that it represents the wishes of the driver very well.

With the foregoing and other objects in view there is provided, in accordance with the invention, a method for determining a torque setpoint of a driver for an internal combustion engine. A drive pedal and a drive pedal sensor for sensing a pedal position of the drive pedal are provided and are associated with the internal combustion engine. The method includes activating different modes of calculation in dependence on at least one switching parameter, thus assigning the pedal position a first driver torque setpoint. After a switchover from an old mode of calculation to a new mode of calculation, the first driver torque setpoint is calculated starting from a second driver torque setpoint under an old interpretation of the pedal position, determined in accordance with the old mode of calculation. A progressive adjustment is made towards a third driver torque setpoint under a new interpretation of the pedal position, determined in accordance with the new mode of calculation, such that the progressive adjustment depends on a time graph of the pedal position and on time, disregarding the time graph of the pedal position.

The invention is distinguished by a method and a corresponding device for determining the driver torque setpoint for an internal combustion engine, to which are assigned a drive pedal and a drive pedal sensor that senses the pedal position for the drive pedal. Depending on at least one switching parameter, different modes of calculation are activated, these enabling each pedal position to be assigned to the driver torque setpoint. After the switchover from an old mode of calculation to a new mode of calculation, the driver torque setpoint is progressively adjusted, starting from the driver torque setpoint under the old interpretation of the pedal position using the old mode of calculation, towards a driver torque setpoint under the new interpretation of the pedal position using the new mode of calculation, in a way which depends on the time graph of the pedal position and, simultaneously, depends on the time disregarding the time graph of the pedal position. By making the progressive adjustment of the driver torque setpoint, to the new interpretation of the pedal position, a function of the pedal setting it is possible, with appropriate pedal movements, to achieve quickly the complete adoption of the new interpretation of the pedal position in the determination of the driver torque setpoint.

The modes of calculation for the driver torque setpoint will preferably be based on analytical functions or on sets of characteristics that are different for each mode of calculation.

On the other hand, making the progressive adjustment of the driver torque setpoint to the driver torque setpoint at the new interpretation of the pedal position a function of time is a simple way of ensuring that in every case the adjustment can be completed within a specifiable time.

According to an advantageous embodiment of the invention, the driver torque setpoint is determined in the current computational pass in dependence on the driver torque setpoint in the last computational pass and of the driver torque setpoints under the new interpretation of the pedal position according to the new mode of calculation in the current and last computational passes. This provides a simple way of avoiding the need to save values from further back.

According to a further advantageous embodiment of the invention, after a switchover from an old to a new mode of calculation, a follow-on torque is determined by forming the difference between the driver torque setpoints under the new interpretation of the pedal position in the current computational pass and in the last computational pass, and adding the driver torque setpoint in the last computational pass to this difference. The driver torque setpoint is then determined as a function of the follow-on torque. In this way, the characteristic behavior of the driver torque setpoint in accordance with the new interpretation of the pedal position is adopted immediately following the time of the switchover.

According to a further advantageous embodiment of the invention, after the switchover from the old mode of calculation to the new mode of calculation, a torque difference is determined. The torque difference is the difference between the driver torque setpoint, under the new interpretation of the pedal position corresponding to the new mode of calculation in the current computational pass, and the follow-on torque. If the sign of the difference in the pedal positions in the current and the last computational passes is the same as the sign of the torque difference, a first correction factor is determined in dependence on the pedal positions in the current and the last computational passes. The driver torque setpoint for the current computational pass is determined in dependence on the torque difference and the first correction factor. This provides a simple way of ensuring that a pedal-position-based progressive adjustment, towards the driver torque setpoint in accordance with the new interpretation of the pedal position, is only effected if the driver will not perceive it, and hence in a simple way. guarantees very good driving characteristics.

Furthermore, this also ensures that it is not necessary to store temporarily any driver torque setpoint details from further back and that, in the event of any further switchover in the meantime to another mode of calculation, a further progressive adjustment to the new mode of calculation can be simply effected.

According to a further advantageous embodiment of the invention, after the switchover from an old mode of calculation to a new mode of calculation, the torque difference is determined and a second correction factor is determined in dependence on the time interval between two successive computational passes, a target time at which the driver torque setpoint is to correspond to the driver torque setpoint for the new interpretation of the pedal position, and the time of the current computational pass. The driver torque setpoint for the current computational pass is then determined in dependence on the torque difference and the second correction factor.

This provides a simple way of ensuring that the progressive adjustment of the driver torque setpoint to the driver torque setpoint in accordance with the new interpretation of the pedal position is completed at the latest when the target time is reached, in particular also when the drive pedal has not been moved at all.

Other features which are considered as characteristic for the invention are set forth in the appended claims.

Although the invention is illustrated and described herein as embodied in a method and a device for determining a driver torque setpoint for an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
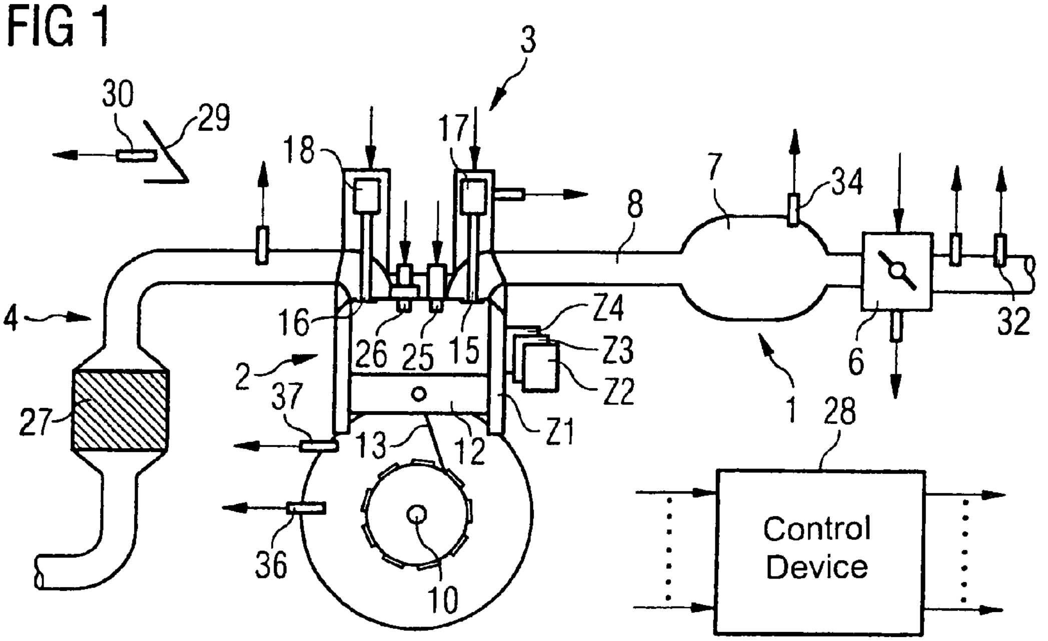
FIG. 1 is an illustration of an internal combustion engine with a control device.

In all the figures of the drawing, sub-features and integral parts that correspond to one another bear the same reference symbol in each case. Referring now to the figures of the drawing in detail and first, particularly, to FIG. 1 thereof, there is shown an internal combustion engine which has an induction manifold 1, an engine block 2, a cylinder head 3 and an exhaust manifold 4. The induction manifold 1 will preferably have a throttle valve 6, an accumulator 7 and an induction manifold passage 8, which feeds into a cylinder Z1 through an induction port in the engine block 2. Further, the engine block 2 has a crankshaft 10, which is linked to a piston 12 in the cylinder Z1 by a connecting rod 13.

The cylinder head has valve gear with a gas inlet valve 15, a gas outlet valve 16 and valve actuators 17, 18. In addition, the cylinder head has an injection valve 25, and possibly a spark plug 26. Alternatively, the injection valve 25 can also be disposed in the induction manifold passage 8.

In addition, a control device 28 is provided, and contains a device for determining the driver torque setpoint and to which are assigned sensors that capture various measured variables and in each case determine the measured value of the measured variable. The control device 28 determines manipulated variables, as a function of at least one of the measured variables, which are then converted into one or more actuating signals to control the actuators by appropriate actuator drives.

The sensors are a drive pedal sensor 30, which captures a pedal position PV representing the degree of pressure down on a drive pedal 29, a temperature sensor 32 which captures the inlet manifold air temperature TIM, a crankshaft angle sensor 36 which captures a crankshaft angle, to which is assigned a rotational speed N, and a further temperature sensor 37 which captures a coolant temperature TCO. Depending on the embodiment of the invention, any required subset of the sensors mentioned may be present, or additional sensors may also be present.

The actuators are, for example, the throttle valve 6, the gas inlet and gas outlet valves 15, 16, the injection valve 25 and the spark plug 26.

Apart from the cylinder Z1, any required number of additional cylinders Z2 to Z4 are generally present, to which corresponding actuators are then also assigned.

Figure 2:
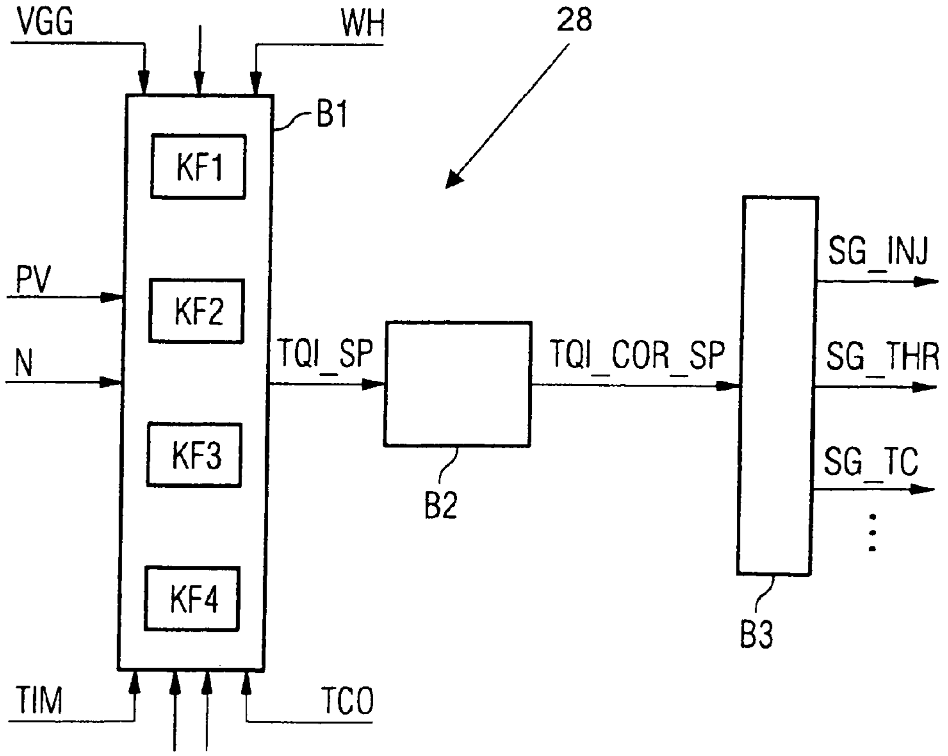
FIG. 2 is a block diagram of parts of the control device that are relevant to the invention.

FIG. 2 shows the control device 28, which incorporates a first block. The pedal position PV and the rotational speed N are fed to the first block B1. In the block B1 there are several sets of characteristics KF1, KF2, KF3, KF4, by which the pedal position PV is assigned to a driver torque setpoint TQI_SP. Depending in each case on prescribed switching parameters, one of the sets of characteristics KF1 to KF4 is activated for determining the driver torque setpoint TQI_SP. The switching parameters can be influenced, for example, by a selector lever WH on an automatic gearbox, or by a switch in the passenger compartment of the vehicle, by which the driver can select between sporty driving characteristics and fuel-economy driving characteristics, or as a function of the gear selection for a countershaft gearbox VGG.

Figure 5:
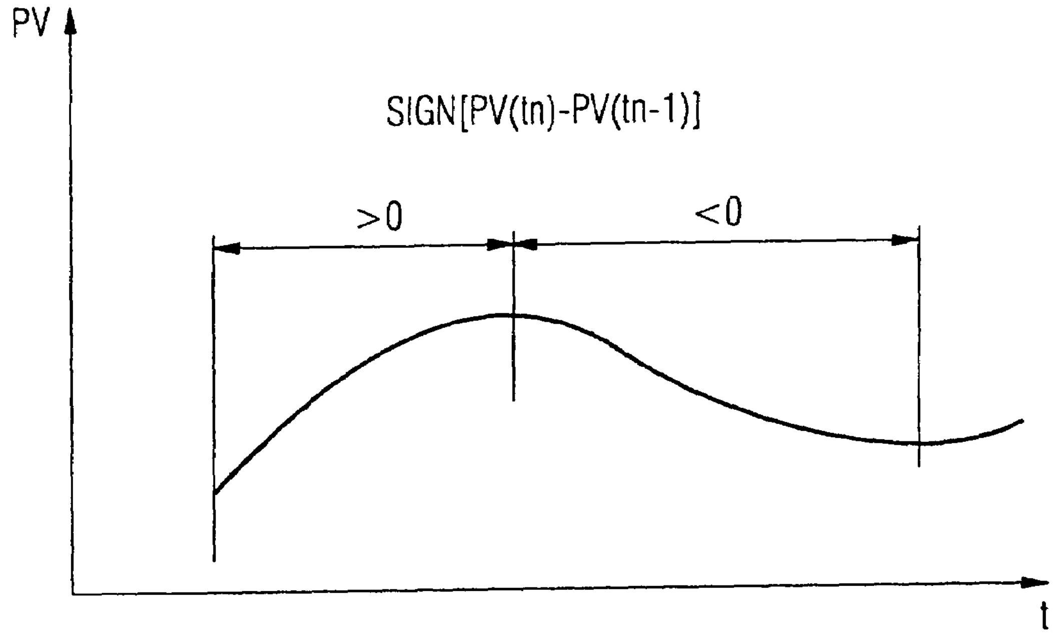
FIG. 5 is a time-graph of a pedal position.
Figure 6:
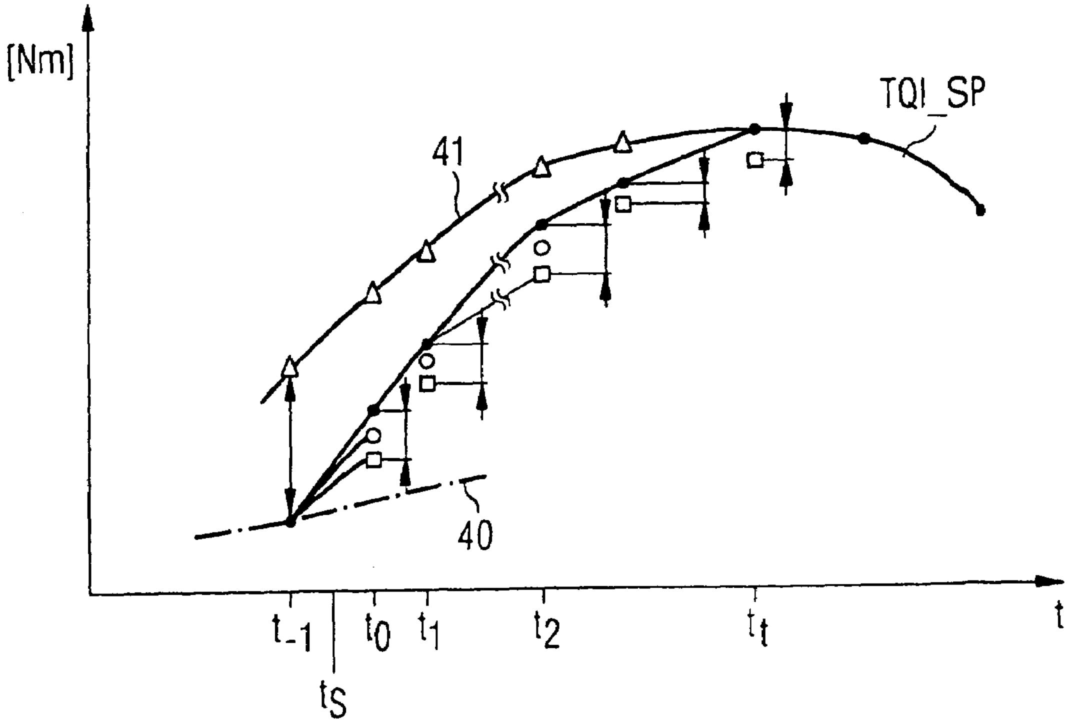
FIG. 6 is a time-graph of the driver torque setpoint.

FIGS. 5 and 6 show examples of the assignment of the pedal position PV to the driver torque setpoint TQI_SP. The time axes in FIGS. 5 and 6 are identical. Reference numeral 40 identifies a curve that is characteristic of a graph of the driver torque setpoint according to a fuel-economy set of characteristics, for example the set of characteristics KF1. Reference numeral 41 shows a graph of the driver torque setpoint TQI_SP for sporty driving characteristics, such as is represented by the set of characteristics KF2, for example.

Figure 3:
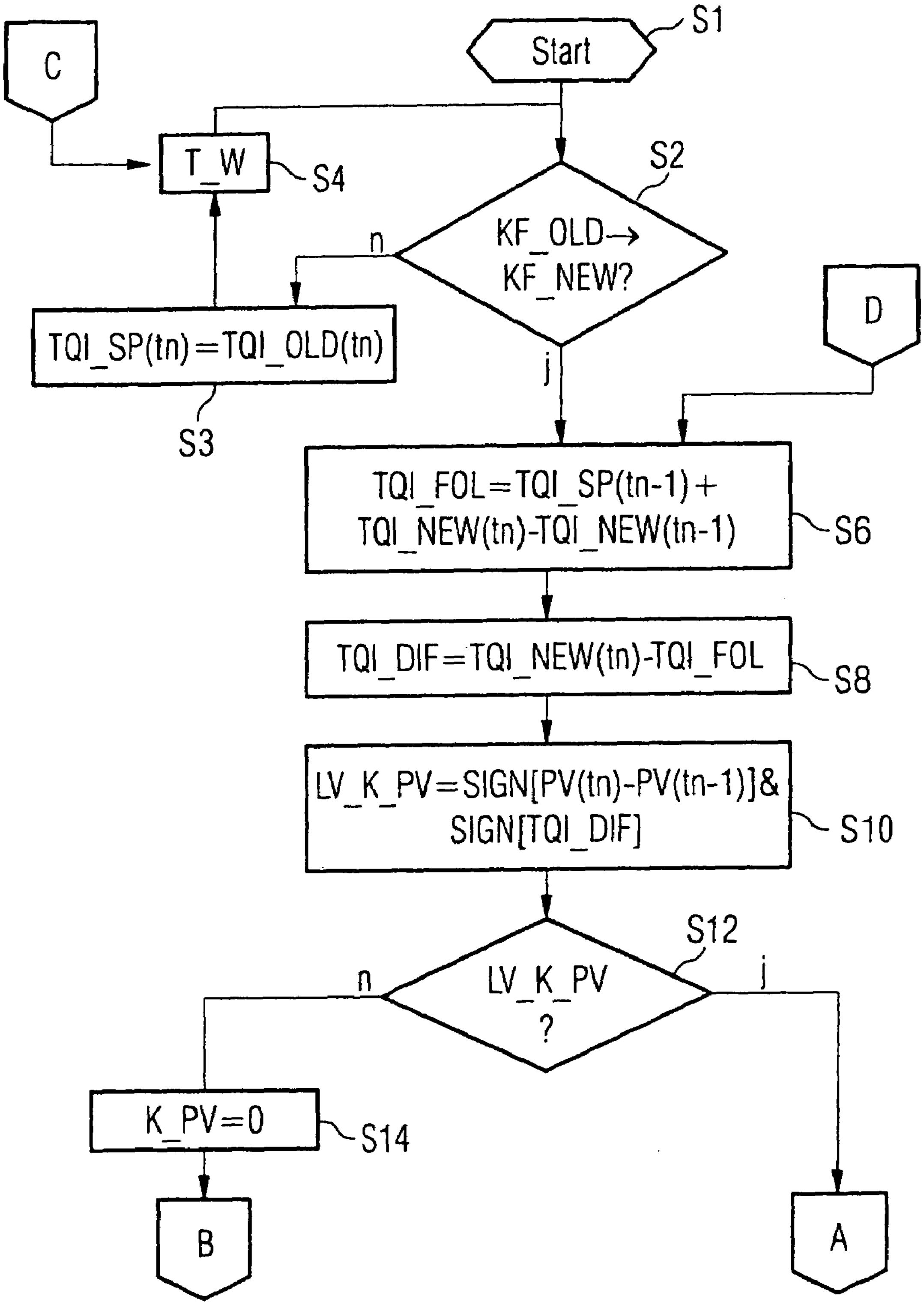
FIGS. 3 and 4 are flow charts showing first and second parts of a program for determining the driver torque setpoint.
Figure 4:
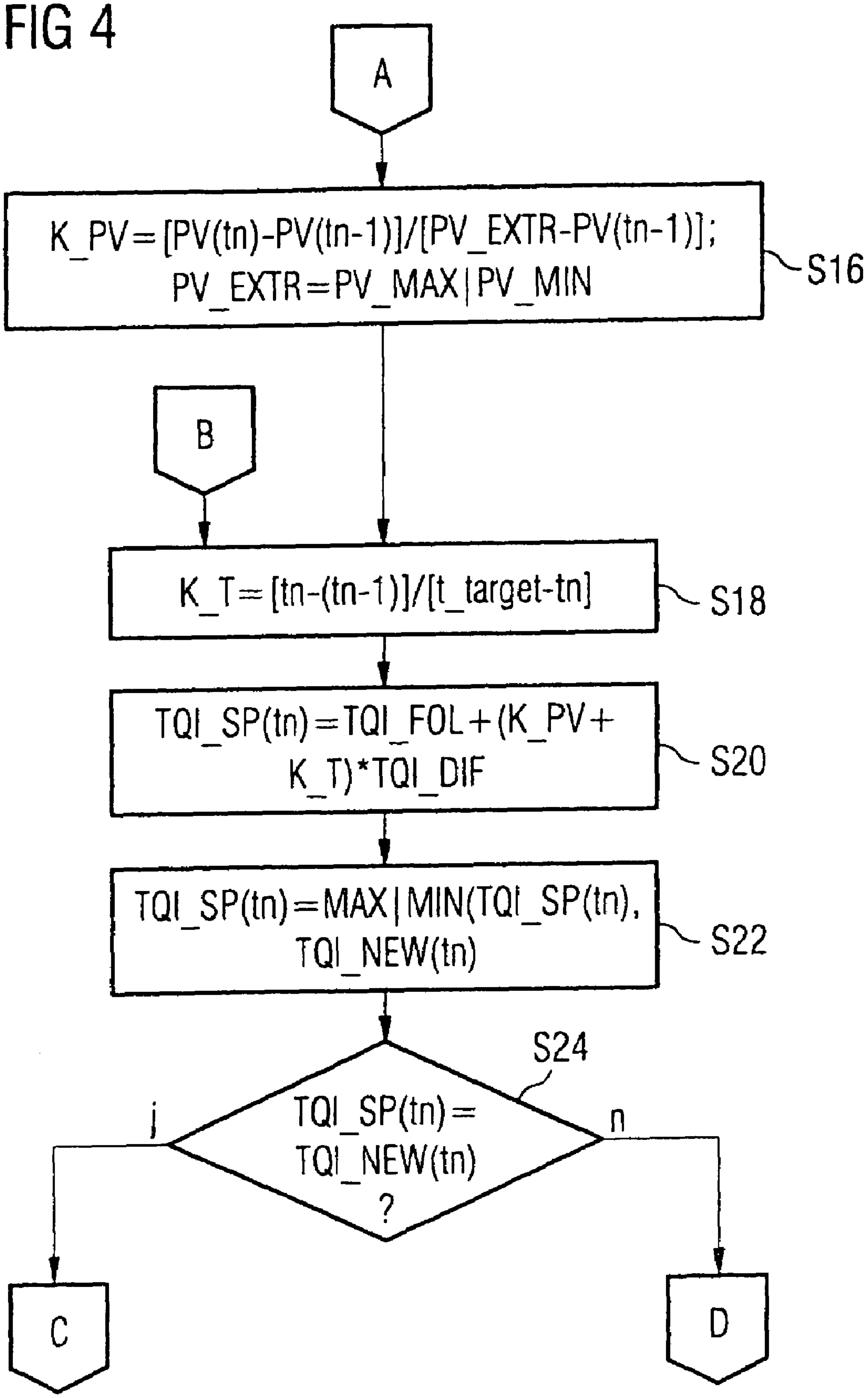

Furthermore, the assignment of the pedal position PV to the driver torque setpoint TQI_SP can also be dependent on the inlet manifold air temperature TIM, the coolant temperature TCO and if necessary other variables. After the switchover from an old set of characteristics to a new set of characteristics, the driver torque setpoint TQI_SP is progressively adjusted, starting from the driver torque setpoint TQI_OLD under an old interpretation of the pedal position corresponding to the old set of characteristics, towards the driver torque setpoint under a new interpretation of the pedal position corresponding to the new set of characteristics. For this purpose, a program is processed in block B1, this being explained in more detail later by reference to FIGS. 3 and 4.

The driver torque setpoint, TQI_SP, determined in block B1 for the current computational pass is passed on to a block B2. The driver torque setpoint TQI_SP is recalculated at each of specifiable regular time intervals or each time the crankshaft is at a specifiable angle, i.e. segment-synchronously, whereby the time intervals can be, for example, 10 ms. Hence the driver torque setpoint TQI_SP is determined once in each computational pass.

In block B2, a torque TQI_COR_SP which is actually to be set is then determined as a function of the driver torque setpoint TQI_SP. In this connection, account is taken of torque requirements, for example, for an idle speed regulator, a vehicle speed limiter, a traction slip control system, an engine torque slip controller, a traction control system or other torque requirements. In so doing, the time graph of the actual torque to be set, TQI_COR_SP, can be smoothed in such a way that no unwanted backward movements (also called "jerking") occur.

The actual torque to be set, TQI_COR_SP, is then passed to a block B3, in which actuating signals for the internal combustion engine actuators are then determined. Thus, for example, an actuating signal SG_INJ can be determined for the injection valve 25, an actuating signal SG_THR for any throttle valve 6 that is present, or an actuating signal SG_TC for any exhaust gas turbocharger that is fitted. Over and above this, other actuating signals can also be determined in block B3.

The program for determining the driver torque setpoint is executed in the control device 28. It is preferably started at a time close to when the internal combustion engine is started, in the step S1 (FIG. 3) in which any variables are initialized as necessary.

In step S2 a check is made as to whether a switchover has been made from an old set of characteristics KF_OLD to a new set of characteristics KF_NEW, which in each case is used to make an assignment of the pedal position PV to the driver torque setpoint TQI_SP. The old set of characteristics KF_OLD can be one of the sets of characteristics KF1–KF4 in the block B1. The same applies for the new set of characteristics KF_NEW. If the condition in step S2 is not satisfied, then a step S3 determines the driver torque setpoint for the current computational pass, characterized by time tn of the current computation, as a function of the driver torque setpoint TQI_OLD under the old interpretation of the drive pedal in accordance with the old set of characteristics KF_OLD. In step S4, the program then pauses for a specifiable waiting time T_W, before the condition in step S2 is checked once more. Alternatively, the program can also pause in step S4 for a specifiable crankshaft angle range, or until a specified crankshaft angle is reached.

On the other hand, if the condition in step S2 is satisfied, then a step S6 determines a follow-on torque TQI_FOL under the new interpretation of the pedal position, and specifically by forming a difference between the driver torque setpoints TQI_NEW(tn), TQI_NEW(tn−1) under the new interpretation of the pedal positions in the current computational pass and in the last computational pass, characterized by the time tn−1 of the last computation, and adding the driver torque setpoint (TQI_SP(tn−1)) in the last computational pass to the difference. The follow-on torque TQI_FOL has the same gradient, in relation to the pedal position PV, as the driver torque setpoint TQI_NEW under the new interpretation of the pedal position.

A step S8 determines a torque difference TQI_DIF as a function of the difference between the driver torque setpoint TQI_NEW, determined in the current computational pass under the new interpretation of the pedal position, and the follow-on torque TQI_FOL.

After this, in step S10, a boolean variable LV_K_PV is determined with a value which depends on the logical ANDing of two sign functions, SIGN. The first sign function is used to determine the sign of the difference between the pedal position in the current computational pass and the pedal position in the last computational pass. In the second sign function, the sign of the torque difference TQI_DIF is determined. The boolean variable LV_K_PV is true if the signs from the two sign functions are the same, and false if the signs from the two sign functions are not the same.

In a step S12 which then follows, a check is made as to whether the boolean variable LV_K_PV is true. If the condition in step S12 is not satisfied, then a first correction factor K_PV is given a neutral value, i.e. it is preferably set to zero, and the processing is continued in step S18 (see FIG. 4).

On the other hand, if the condition in step S12 is satisfied, then the first correction factor K_PV is determined in step S16.

The correction factor K_PV is calculated as follows:

$$K\_PV=[PV(tn)-PV(tn-1)]/[PV\_EXTR-PV(tn)-1))]$$

and $$PV\_EXTR=PV\_\mathrm{MAX}|PV\_\mathrm{MIN}$$

Here, PV_EXTR designates an extreme pedal position, which can therefore be either a minimum position of the pedal, PV_MIN, or a maximum position of the pedal, PV_MAX. It will be the maximum pedal position PV_MAX when the torque difference TQI_DIF is positive, and the minimum pedal position PV_MIN when the torque difference TQI_DIF is negative.

In step S18 a second correction factor K_T is then determined, this being a function of the time of the current computation tn, the time of the last computation tn-1, and a target time t_target, as specified in step S18.

After this, in step S20, the driver torque setpoint TQI_SP is then determined by adding the first and second correction factors, multiplying this sum by the torque difference TQI_DIF and adding to it the follow-on torque TQI_FOL.

Step S22 which follows then ensures that, when the torque difference TQI_DIF is positive, the driver torque setpoint TQI_SP does not exceed the driver torque setpoint TQI_NEW under the new interpretation of the pedal position, and that when the torque difference TQI_DIF is positive the driver torque setpoint TQI_SP is not less than the driver torque setpoint TQI_NEW in accordance with the new interpretation of the pedal position.

In step S24, a check is made as to whether the driver torque setpoint TQI_SP is equal to the driver torque setpoint TQI_NEW according to the new interpretation of the pedal position. If this is the case, then the progressive adjustment has been completed, and the processing continues in step S4. If it is not the case, then the processing will continue in step S6, possibly only after the prescribed waiting time T_W has expired. The first correction factor K_PV provides a simple way of ensuring that the progressive adjustment of the driver torque setpoint TQI_SP to the driver torque setpoint TQI_NEW in accordance with the new interpretation of the pedal position takes place specifically at each computational pass, in that the pedal position moves in the "right direction", which is defined by the value of the boolean variable LV_K_PV.

The second correction factor K_T simply ensures that, irrespective of movements of the drive pedal, the progressive adjustment of the driver torque setpoint TQI_SP to the driver torque setpoint TQI_NEW in accordance with the new interpretation of the pedal position is effected by the target time t_target.

In FIG. 6, ts labels a switchover time, at which a switchover takes place from the old set of characteristics KF_OLD to the new set of characteristics KF_NEW. This means that as from a switchover time ts the curve 40 is the time graph of the driver torque setpoint under the old interpretation of the pedal position, and from the switchover time ts the curve 40 is the time graph of the driver torque setpoint under the new interpretation of the pedal position. For each of the time points at which there is a computational pass, t−1, t0, t1, t2, tt, a rectangle identifies the follow-on torque TQI_FOL, an unfilled circle the follow-on torque plus the contribution which depends on the first correction factor, K_PV, and a filled circle the driver torque setpoint TQI_SP which depends on the second correction factor K_T. At the time $t_{tt}$, the progressive adjustment of the driver torque setpoint TQI_SP to the driver torque setpoint TQI_NEW is completed.

This application claims the priority, under 35 U.S.C. § 119, of German patent application No. 10 2004 022 554.0, filed May 7, 2004; the entire disclosure of the prior application is herewith incorporated by reference.

We claim:

1. A method for determining a torque setpoint of a driver for an internal combustion engine, a drive pedal and a drive pedal sensor sensing a pedal position of the drive pedal and associated with the internal combustion engine, which comprises the step of:

activating different modes of calculation in dependence on at least one switching parameter, thus assigning the pedal position a first driver torque setpoint;

after a switchover from an old mode of calculation to a new mode of calculation, calculating the first driver torque setpoint by starting from a second driver torque setpoint under an old interpretation of the pedal position, determined in accordance with the old mode of calculation; and making a progressive adjustment towards a third driver torque setpoint under a new interpretation of the pedal position, determined in accordance with the new mode of calculation, such that the progressive adjustment depends on a time graph of the pedal position and on time, disregarding the time graph of the pedal position.

2. The method according to claim 1, which further comprises:

determining the first driver torque setpoint in a current computational pass in dependence on the first driver torque setpoint in a last computational pass and third driver torque setpoints under the new interpretation of the pedal position corresponding to the new mode of calculation in the current and last computational passes.

3. The method according to claim 2, which further comprises after the switchover from the old mode of calculation to the new mode of calculation:

determining a follow-on torque by forming a difference between the third driver torque setpoints under the new interpretation of the pedal position in the current computational pass and in the last computational pass;

adding the first driver torque setpoint in the last computational pass to the difference; and determining the first driver torque setpoint in the current computational pass in dependence on the follow-on torque.

4. The method according to claim 3, which further comprises after the switchover from the old mode of calculation to the new mode of calculation:

determining a torque difference being a difference between the third driver torque setpoint under the new interpretation of the pedal position in the current computational pass, and the follow-on torque;

if a sign of the difference in the pedal positions in the current and the last computational passes is the same as a sign of the torque difference, determining a first correction factor in dependence on pedal positions in the current and the preceding computational passes; and determining the first driver torque setpoint for the current computational pass in dependence on the torque difference and the first correction factor.

5. The method according to claim 3, which further comprises after the switchover from the old mode of calculation to the new mode of calculation:

determining a torque difference being a difference between the third driver torque setpoint under the new interpretation of the pedal position in the current computational pass and the follow-on torque;

determining a second correction factor in dependence on a time interval between two successive computational passes, a target time at which the first driver torque setpoint is to correspond to the third driver torque setpoint in accordance with the new interpretation of the pedal position, and according to a time of the current computational pass; and determining the first driver torque setpoint for the current computational pass in dependence on the torque difference and the second correction factor.

6. A device for determining a driver torque setpoint for an internal combustion engine, a drive pedal and a drive pedal sensor which senses the pedal position of the drive pedal being associated with the internal combustion engine, the device comprising:

a control device programmed to:

activate different modes of calculation in dependence on at least one switching parameter for enabling the pedal position to be assigned to a first drive torque setpoint; and after the switchover from an old mode of calculation to a new mode of calculation, calculate the first driver torque setpoint by progressively adjusting a second driver torque setpoint under an old interpretation of the pedal position towards a third driver torque setpoint under a new interpretation of the pedal position, the progressive adjustment being dependent on a time graph of the pedal position and simultaneously on a time, disregarding the time graph of the pedal position.

* * * * *